US009772070B2

(12) United States Patent
Harada et al.

(10) Patent No.: US 9,772,070 B2
(45) Date of Patent: Sep. 26, 2017

(54) CHEMICAL ILLUMINANT

(71) Applicant: Lumica Corporation, Fukuoka (JP)

(72) Inventors: Shiro Harada, Fukuoka (JP); Yuichi Komuro, Fukuoka (JP)

(73) Assignee: Lumica Corporation, Fukuoka (JP)

( * ) Notice: Subject to any disclaimer, the term of this patent is extended or adjusted under 35 U.S.C. 154(b) by 92 days.

(21) Appl. No.: 14/853,521

(22) Filed: Sep. 14, 2015

(65) Prior Publication Data

US 2016/0123540 A1 May 5, 2016

(30) Foreign Application Priority Data

Nov. 5, 2014 (JP) ................................ 2014-225413

(51) Int. Cl.
*F21K 2/06* (2006.01)
*B29C 65/00* (2006.01)
*B65B 51/22* (2006.01)

(52) U.S. Cl.
CPC ................ *F21K 2/06* (2013.01); *B65B 51/22* (2013.01)

(58) Field of Classification Search
CPC ........................................................ F21K 2/06
See application file for complete search history.

(56) References Cited

U.S. PATENT DOCUMENTS 5,938,313 A * 8/1999 Fujita ........................ F21K 2/06 362/34
6,062,380 A 5/2000 Dorney

FOREIGN PATENT DOCUMENTS

| | | | |
|---|---|---|---|
| JP | H01-66701 | U | 4/1989 |
| JP | 08-280421 | A | 10/1996 |
| JP | 2001-070124 | A | 3/2001 |
| JP | 4044934 | B2 | 11/2007 |
| JP | 3140639 | U | 4/2008 |

OTHER PUBLICATIONS

Office Action in corresponding Japanese Patent Application No. 2014-225413 mailed Aug. 30, 2016, with translation (6 pages).

* cited by examiner

*Primary Examiner* — Elmito Breval
(74) *Attorney, Agent, or Firm* — Osha Liang LLP

(57) ABSTRACT

A chemical illuminant includes an outer case comprising sealable opposite ends situated in a lengthwise direction of the outer case; one ampoule housed in the outer case; a pair of compositions that emit light when mixed with each other; and a spacer arranged in the outer case, wherein one of the compositions is contained in a space formed inside of the outer case, but outside of the ampoule, and the other of the compositions is contained in the ampoule, a space in which the one of the compositions is contained is formed between the spacer and an inner surface of the outer case, at least one recess is formed at a periphery of the spacer, and the ampoule is supported in the recess.

13 Claims, 3 Drawing Sheets

CHEMICAL ILLUMINANT

TECHNICAL FIELD

The invention relates to a chemical illuminant including two chemical compositions that chemically emit light when mixed with each other, which can be made light in weight even if a size thereof is enlarged.

BACKGROUND ART

As suggested in Japanese Patent No. 4044934 and Japanese Patent Application Publication No. 1996(H8)-280421, there has been broadly used a chemical illuminant chemically emitting light by mixing two kinds of liquids or solids with each other, for instance, a pair of fluorescent liquid and oxidizer liquid. Such a chemical illuminant is used as a concert light in events, a handy light such as a light used for disaster prevention, a float used for fishing at night, or ornaments used in a place of a ceremony.

As disclosed in the above-mentioned Patent and Publication, the chemical illuminant is designed to include an outer cylindrical case, an inner case comprised of a glass ampoule, and a pair of two liquids or solids chemically emitting light when mixed with each other. One of the liquids or solids is filled in the inner case, and the other is filled in a space formed outside of the inner case and inside of the outer case. In no use of the chemical illuminant, the two liquids or solids are separated from each other by means of the inner case. In use of the chemical illuminant, the outer case is bent sufficiently to break the inner case, resulting in that the two liquids or solids mix with each other to thereby emit light within the outer and inner cases.

A chemical illuminant is provided in various shapes. For instance, the chemical illuminant suggested in Japanese Patent Application Publication No. 2001-70124 is designed to include a cup having a two-layered structure, and an ampoule housed in the cup. The cup is obtained by improving a conventionally known luminescent cup. Since luminescent liquid emits light during use, the chemical illuminant can provide beautiful scene. Furthermore, a cap of a bottle can be opened by a bottom of the cup.

A conventional chemical illuminant usually includes an outer cylindrical case containing therein one of two liquids or solids, and an inner case housed in the outer cylindrical case and containing therein the other of two liquids or solids. If the conventional chemical illuminant were attempted to design larger in size, the outer and inner cases would have an increased diameter and/or length, and accordingly, a volume of the two liquids or solids is unavoidably increased, which results in the chemical illuminant increased in weight, in which case, usability of the chemical illuminant is deteriorated.

The above-mentioned cup has a two-layered structure to define an outer case and an inner case. In the cup, a plurality of glass ampoules are arranged between the outer and inner cases. Since the chemical illuminant is centrally open, the chemical illuminant can be light in weight and have a broad plane from which light is emitted. However, since the two cases have to be sealed, it would be difficult to carry out welding the cases made of resin, causing a problem of liquid leakage out of the cases.

Furthermore, the chemical illuminant is accompanied with problems in that the inner case is deformed due to an inner pressure generated when light is emitted as a result of mixture of the two liquids, and the ampoules are difficult to be folded even if a bending stress acts on the ampoules.

CITATION LIST

Patent Literature

[Patent Literature 1] Japanese Patent No. 4044934

[Patent Literature 2] Japanese Patent Application Publication No. 1996(H8)-280421

[Patent Literature 3] Japanese Patent Application Publication No. 2001-70124

SUMMARY OF THE INVENTION

According to one or more embodiments of the present invention, a chemical illuminant can be made light in weight and have a broad plane from which light is emitted. Furthermore, the chemical illuminant has a high resistance against an inner pressure generated by light emission, prevents liquid leakage, and permits glass ampoules to be easily folded.

In one aspect according to one or more embodiments of the present invention, a chemical illuminant includes an outer case having a length in a certain direction (lengthwise direction), and having sealable opposite ends situated in the certain direction, at least one ampoule housed in the outer case, a pair of compositions which emit light when mixed with each other, and a spacer arranged in the outer case, wherein one of the compositions is contained in a space formed inside of the outer case, but outside of the ampoule, and the other of the compositions is contained in the ampoule, a space in which the one of the compositions is contained is formed between the spacer and an inner surface of the outer case, at least one recess is formed at a periphery of the spacer, and the ampoule is supported in the recess.

In the chemical illuminant in accordance with one or more embodiments of the present invention, the spacer arranged in the outer case fixes the ampoule in which one of the two liquids is contained, at a predetermined position. Furthermore, a volume of the liquids can be reduced through the use of the spacer, ensuring that a weight of the resultant chemical illuminant can be reduced and that a sufficient area from which light is emitted can be obtained. In addition, since an ampoule is fixed in position by the spacer, the ampoule can be held without breakage until the chemical illuminant is in use. In use of the chemical illuminant, the ampoule can be folded to be broken by a small bending force.

One or more embodiments of the present invention are directed to a chemical illuminant chemically emitting light by mixing two chemical compositions with each other. As the two chemical compositions which emit light when mixed with each other, liquids such as fluorescent liquid (oxalate, pigment and solvent) and oxidizer liquid (an oxidizer such as hydrogen peroxide, catalyst, and solvent) are generally used. As an alternative, compositions in the form of powder, grain or solid may be used if they can emit light when mixed with each other, similarly to the above-mentioned liquids. For example, the two compositions may be in the form of liquid, which can be readily mixed with each other, and can uniformly and swiftly emit light. If one of the two compositions is in the form of solid, the other composition in the form of liquid penetrates a breakable ampoule, and then, the chemical illuminant emits light. That is, the reaction for emitting light occurs relatively slowly. Herein, each of the compositions which emit light when mixed with each other is generally defined as an aggregate of a plurality of chemical materials. However, the composition in the specification includes not only such an aggregate, but also a single material.

One or more embodiments of the present invention are characterized in a structure of a chemical illuminant which emits light when two kinds of compositions are mixed with each other. The chemical illuminant in accordance with one or more embodiments of the present invention includes an outer case having opposite ends sealed. One of the two compositions is filled in a space formed between an inner surface of the outer case and an ampoule housed in the outer case. The chemical illuminant in accordance with one or more embodiments of the present invention is required in non-use to prevent the two compositions from being mixed with each other by means of an ampoule or ampoules housed in the outer case. One of the two compositions is filled in a space formed between an inner surface of the outer case and an ampoule(s) housed in the outer case, and the other is contained in the ampoule(s).

The outer case in the chemical illuminant in accordance with one or more embodiments of the present invention is generally made of resin. For instance, the outer case is fabricated by a resin-injection process. The resin includes polyethylene (PE) and polypropylene (PP) and so on in a standpoint of a resistance to heat, a resistance to solvent, and a mechanical strength. For instance, polypropylene resin composition comprised of polypropylene and additives is commercially available. The outer case may be made of such polypropylene resin composition.

In order for light emitted from the chemical illuminant to be scattered more broadly, the resin composition of which the outer case is made may include a light-scattering agent. Furthermore, the resin composition may include a colorant in order to change a color tone of the outer case. The outer case may be designed to be cloud to thereby have high light-scattering characteristics by controlling conditions for fabricating the outer case to thereby control crystallization.

As mentioned above, the outer case in one or more embodiments of the present invention is made of resin. The outer case is sealed by a predetermined process after introducing an ampoule(s) and a chemical composition therein. As a typical process for sealing the outer case, a cap is inserted into an opening end of the outer case. For instance, a cap is thermally welded to an opening end of the outer case. In order for a cap to be inserted an opening end of the outer case, the outer case is designed to have a space into which a cap is inserted. Furthermore, for example, the outer case may be cylindrical and have an area, to which a cap is to be welded, at a circumferential periphery thereof, in order for a cap to be readily thermally welded to the outer case.

The outer case may be designed to have a shape in conformity with a purpose in accordance with which the chemical illuminant is used. For instance, the outer case may be cylindrical or substantially rectangular parallelepiped. Since the chemical illuminant in accordance with one or more embodiments of the present invention can be designed to decrease a weight thereof because of the space arranged in the outer case, the outer case may be designed to have an increased diameter and/or length to thereby provide an increased area from which light is emitted. The area from which light is emitted is dependent principally on a size of the outer case. The outer case may be designed to include a connection section with which another part such as a clip is connected, or a threaded section. By designing the outer case to include such a connection section, the outer case can be used in various purposes by being connected with another part.

The chemical illuminant in accordance with one or more embodiments of the present invention is designed to include a spacer centrally housed in the outer case. The spacer is formed at a periphery thereof with at least one recess in which the ampoule is supported. The spacer is designed to have such a shape that a space in which one of the two compositions is contained is formed between the spacer and an inner surface of the outer case. The spacer makes it possible to reduce a volume of the composition to be contained in the outer case. Furthermore, since the ampoule is supported by the recess of the spacer, the ampoule can be stably supported.

The chemical illuminant in accordance with one or more embodiments of the present invention includes a spacer to be housed in the outer case. One of the two compositions is filled in a space formed between the spacer and the outer case, and the other of the two compositions is contained in the ampoule. When the ampoule is broken by being folded, the two compositions react with each other to thereby chemically emit light in the outer case. The thus generated light is emitted out of the chemical illuminant through an outer surface of the outer case. Accordingly, for example, the spacer may be arranged coaxial with the outer case, and a space may be formed between the spacer and the outer case at an outer periphery of the chemical illuminant such that the chemical illuminant can emit light wholly circumferentially of the outer case. For instance, a space to be formed between the spacer and the outer case is in the range of about 0.3 mm and about 5.0 mm both inclusive.

As mentioned above, the spacer is formed with at least one recess in which the ampoule is held. The recess defines a groove extending in a lengthwise direction of the spacer. The ampoule is inserted into the groove. Since the ampoule is held in the recess, the ampoule can be protected against breaking in no-use, and further, can be readily broken in use by exerting a small bending force thereonto.

For example, the spacer may be formed with two or greater, but five or smaller recesses.

The chemical illuminant in accordance with one or more embodiments of the present invention has a shape particularly when the chemical illuminant has a large diameter. Thus, a plurality of the ampoules may be arranged at an outer periphery of the spacer in order for the compositions, in particular, the composition contained in the ampoules, to spread along an outer surface of the spacer, and to be mixed with each other. Such arrangement provides balanced fine appearance and massive feeling.

For example, the spacer may have a specific gravity smaller than that of the two compositions, ensuring that the chemical illuminant can be lightened as a whole.

Furthermore, the spacer may be made of a material which does not absorb the two compositions thereinto, ensuring that the chemical illuminant can be further lightened, since the volume of the compositions absorbed into the spacer is reduced.

For example, the space may be made of a material by which light is highly scattered, for instance, a white material, ensuring that a color of light emitted from the chemical illuminant in use is scarcely changed, and further, a loss of light can be reduced to thereby make it possible for light to be outwardly scattered with the result of high brightness. From this standpoint, the spacer may be made of foaming resin. Furthermore, the spacer may have a resistance against solvent to be used in the chemical compositions. Thus, the spacer may be composed of polyethylene (PE), polypropylene (PP), and/or a mixture thereof.

The chemical illuminant in accordance with one or more embodiments of the present invention includes at least one ampoule supported in the recess of the spacer. The ampoule is filled with the other of the two compositions. The ampoule has such a strength that the ampoule is broken in the outer case when a bending force exerts onto the chemical illuminant. The ampoule is made generally of glass. Glass is able to separate one of the liquids contained in the ampoule from the other existing outside of the ampoule when the chemical illuminant is not in use, and to be readily broken when a load caused by folding the chemical illuminant is exerted thereonto.

The chemical illuminant in accordance with one or more embodiments of the present invention may be folded to the extent that the breakable ampoule is broken. In particular, in the case that the ampoule is made of glass, the chemical illuminant can be folded in a gentle curve to break the ampoule.

The chemical illuminant in accordance with one or more embodiments of the present invention has a structure suitable to an illuminant having a large diameter. For instance, even if the chemical illuminant were designed to have a diameter of 20 mm or greater, preferably 30 mm or greater, a weight thereof could be reduced. The chemical illuminant in accordance with one or more embodiments of the present invention is designed to have a length in accordance with a purpose for which the chemical illuminant is used. For instance, the chemical illuminant may be designed to have a length of 4 inches or greater.

The outer case and the cap can be thermally welded to each other by reducing an area in which the outer case and the cap make contact with each other. Thus, it is possible to reduce a total area at which the outer case and the cap are thermally welded to each other and from which the liquids may leak, and further, possible to uniformly heat the area, resulting in that leakage of the liquids out of the chemical illuminant can be prevented with extremely high possibility.

In addition, even if an internal pressure is increased in the chemical illuminant due to an increase of a total volume of liquid and/or gas generated when the liquids are mixed to react with each other for emitting light, the spacer made of a foaming material can absorb the internal pressure with the result of enhanced safety.

The chemical illuminant in accordance with one or more embodiments of the present invention can be fabricated by a process including, for instance, sealing one of the opposite ends of the outer case, inserting one of the two liquids, the spacer, and the ampoule containing the other of the two liquids therein into the outer case through an open end thereof, and sealing the open end of the outer case. In other words, one or more embodiments of the present invention provides a method of fabricating a chemical illuminant including an outer case having a length in a certain direction, and having sealable opposite ends situated in the certain direction, at least one ampoule housed in the outer case, a pair of compositions which emit light when mixed with each other, a spacer arranged in the outer case, one of the compositions being contained in a space formed inside of the outer case, but outside of the ampoule, the other of the compositions being contained in the ampoule, the spacer having such a shape that a space in which the one of the compositions is contained is formed between the spacer and an inner surface of the outer case, the spacer being formed at a periphery thereof with at least one recess in which the ampoule is supported, the method including sealing one of the opposite ends of the outer case, inserting one of the two liquids, the spacer, and the ampoule into the outer case through an open end thereof, and sealing the open end of the outer case.

The above-mentioned method can provide a lightened chemical illuminant that includes the spacer therein.

More specifically, the chemical illuminant in accordance with one or more embodiments of the present invention can be fabricated by a process mentioned below, for instance.

Firstly, an outer case in the form of a tube having open opposite ends is cut into a predetermined length.

Secondly, a cap is welded to one of the ends of the outer case. Thus, the outer case has an open end and the sealed end.

Thirdly, fluorescent liquid as one of the two liquids used for emitting light is poured into the outer case in a predetermined volume.

Fourthly, a solid spacer formed at a periphery thereof with a recess in which an ampoule is held, and made of a foaming material such as PP is centrally inserted into the outer case in which one of the two liquids has been already poured.

Fifthly, an ampoule filled with the other of the two liquids is inserted into the recess of the spacer having been inserted into the outer case.

Finally, a cap is welded to the open end of the outer case. Thus, there is obtained the chemical illuminant.

The chemical illuminant fabricated by the above-mentioned process contains therein compositions such as liquids for emitting light. Since a portion of the outer case through which a cap is welded to the outer case can be designed to be a shape by which the cap can be readily welded to the outer case, it is possible to prevent leakage of the liquids out of a resultant chemical illuminant or while the chemical illuminant is being fabricated, ensuring enhanced safety.

Furthermore, since the spacer is designed to have a recess in which an ampoule is supported, even when a plurality of ampoules is housed in the outer case, the ampoules are prevented from making contact with one another. The chemical illuminant can be fabricated without defects.

The advantages obtained by the aforementioned embodiments of the present invention will be described hereinbelow.

One or more embodiments of the present invention provide a lightened chemical illuminant having a broad area from which light is emitted. Furthermore, the chemical illuminant has a resistance against an internal pressure generated by the chemical reaction accompanied with light emission, can prevent the liquids from leaking therefrom, and has such a structure that a glass ampoule can be readily folded to be broken.

One or more embodiments of the present invention further provide a method of fabricating such a chemical illuminant.

The above and other objects and advantageous features of one or more embodiments of the present invention will be made apparent from the following description made with reference to the accompanying drawings, in which like reference characters designate the same or similar parts throughout the drawings.

DETAILED DESCRIPTION OF EMBODIMENTS

Embodiment of the present invention will be explained hereinbelow with reference to drawings. It should be noted that the subject matter encompassed by way of the present invention is not to be limited to the embodiment described hereinbelow.

Figure 1:
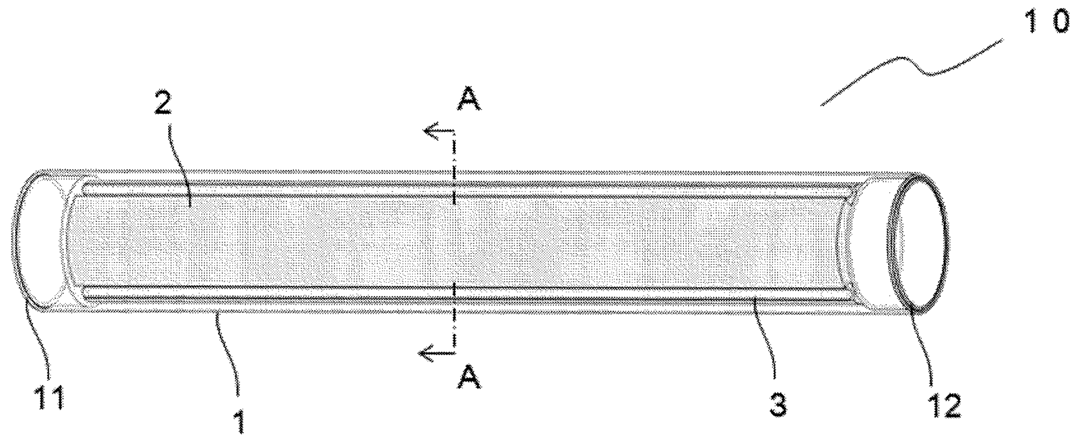
FIG. 1 is a perspective view of the chemical illuminant in accordance with one or more embodiments of the present invention.

FIG. 1 is a perspective view of the chemical illuminant in accordance with one or more embodiments of the present invention.

The illustrated chemical illuminant 10 includes an outer case 1, three ampoules 3, a pair of compositions 5 and 6, and a spacer 2.

The outer case 1 has a length in a certain direction, and has sealable opposite ends situated in the certain direction or in a lengthwise direction thereof. The outer case 1 is cylindrical. The outer case 1 is sealed at opposite ends thereof with caps 11 and 12.

The spacer 2 is solid and cylindrical, and is arranged coaxially with and in the outer case 1. The spacer 2 is formed at a periphery thereof with three recess 21 in each of which the ampoule 3 is supported. Each of the recesses 21 extends in a lengthwise direction of the spacer 2 to thereby define a groove.

Each of the caps 11 and 12 has a circular bottom, and an annular wall standing at the periphery of the circular bottom. The bottoms of the caps 11 and 12 make contact with opposite sides of the spacer 2 when the caps 11 and 12 are attached to the outer case 1.

Figure 2:
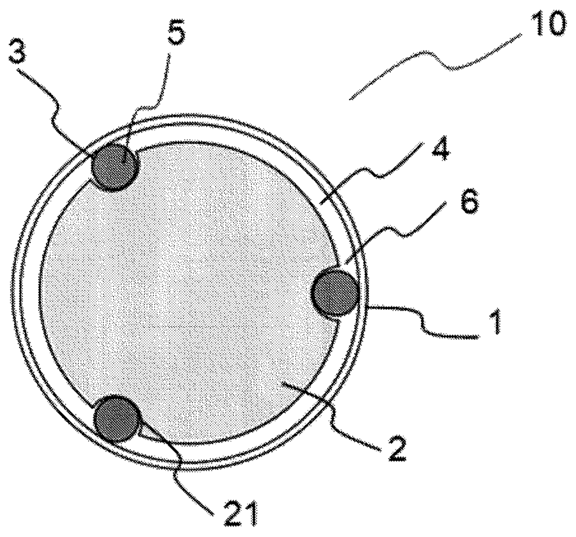
FIG. 2 is a cross-sectional view taken along the line A-A in FIG. 1.

FIG. 2 is a cross-sectional view taken along the line A-A in FIG. 1.

As illustrated in FIG. 2, a space 4 is formed between the spacer 2 and an inner surface of the outer case 1. The space 4 is filled with an oxidizer liquid 6 as one of the compositions by which light is emitted. Each of the ampoules 3 supported in the recess 21 is filled with a fluorescent liquid 5 as the other of the compositions.

In the chemical illuminant 10 illustrated in FIGS. 1 and 2, since the fluorescent liquid 5 and the oxidizer liquid 6 are separated from each other by the ampoules 3 when the chemical illuminant 10 is not in use, light emission is not generated. On the other hand, when the chemical illuminant 10 is used, the outer case 1 is folded such that the ampoules 3 are broken in the outer case 1 and the fluorescent liquid 5 contained in the ampoules 3 is mixed with the oxidizer liquid 6 filling the space 4 therewith. Thus, there is generated light emission. The light emission is generated at an area where the ampoules 3 are disposed and at an area such as the space 4 where the compositions exist. Thus, the light emission is generated along a circumferential periphery of the chemical illuminant 10, ensuring that light emission is generated in a broad area, specifically, an entirety of inside of the outer case 1.

By designing the spacer 2 to be made of a foaming material by which light is scattered, light is scattered by the spacer 2, and accordingly, the chemical illuminant 10 provides apparently a high intensity of light emission.

Furthermore, since the spacer 2 absorbs an internal pressure, the outer case 1 is hardly influenced by fluctuation of the internal pressure, ensuring that the outer case 1 can be prevented from being deformed in a shape thereof.

For instance, the spacer 2 may be designed to be solid and made of polypropylene (PP), and have a diameter of 30 mm and a length of 20 cm, in which case, the resultant chemical illuminant 10 has a weight of about 60 grams. If a chemical illuminant were enlarged in a size with a shape being kept conventional, the resultant chemical illuminant would have a weight of about 140 grams. Thus, the chemical illuminant 10 including the spacer 2 could have a weight half of that of the conventional chemical illuminant.

In the chemical illuminant 10, each of the ampoules 3 may be designed to have a length equal to that of the spacer 2, in which case, the compositions can be mixed with each other over a full length of the chemical illuminant 10, and accordingly, light emission can be uniformly accomplished in a short period of time.

Furthermore, the spacer 2 is designed to have a length equal to a length of the space 4 in a lengthwise direction of the outer case 1, and the movement of the spacer 2 and the ampoules 3 in a lengthwise direction of the outer case 1 is restricted by the caps 11 and 12. Thus, the spacer 2 and the ampoules 3 both housed in the outer case 1 are allowed to move only slightly, ensuring that the chemical illuminant 10 can be prevented from being damaged while being carried.

In a fabrication of the chemical illuminant 10, firstly the cap 11 is welded to the outer case 1. Then, the outer case 1 is caused to stand such that the cap 11 is located downside, and then, the spacer 2 is inserted centrally into the outer case 1 through an open upper end of the outer case 1. Then, the three ampoules 3, each filled with the fluorescent liquid 5, are inserted into the recesses 21 formed at the periphery of the spacer 2. Then, the oxidizer liquid 6 is poured into the space 4 formed between the spacer 2 and the outer case 1. Then, the cap 12 is welded to the open end of the outer case 1 to complete the chemical illuminant 10.

Figure 3:
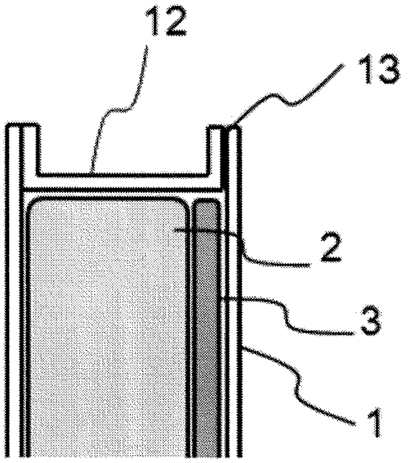
FIG. 3 is a partial cross-sectional view for explaining the step of welding a cap to the outer case in accordance with one or more embodiments of the present invention.

FIG. 3 is a partial cross-sectional view showing the step of welding the cap 12 to the outer case 1.

After the spacer 2, the ampoules 3, and the oxidizer liquid 6 are inserted into the outer case 1 having a lower end having been already sealed with the cap 11, the cap 12 is fit into the outer case 1 through an open end, and then, a portion 13 at which the cap 12 makes contact with the outer case 1 is welded to thereby seal the open end of the outer case 1.

By fabricating the chemical illuminant 10 in accordance with the above-mentioned process, only an area 13 (see FIG. 3) at which the outer case 1 makes contact with the caps 11 and 12, that is, an area of an inner periphery of the outer case 1 is welded, ensuring that the caps 11 and 12 can be stably and firmly welded to the outer case 1 to prevent leakage of the liquid 6 out of the outer case 1.

INDUSTRIAL APPLICABILITY

The chemical illuminant can be used in various purposes as a chemical illuminant having a broad light-emission area. For instance, the chemical illuminant may be used as a concert light, a warning light, and an indicating lamp, similarly to a conventional chemical illuminant, and accordingly, is industrially quite useful.

While one or more embodiments of the present invention has been described in connection with certain embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 2014-225413 filed on Nov. 5, 2014 including specification, claims, drawings and summary is incorporated herein by reference in its entirety.

What is claimed is:

1. A chemical illuminant comprising:

an outer case comprising a single hollow space extending in a lengthwise direction of the outer case and sealable opposite ends situated in the lengthwise direction of the outer case;

an ampoule housed in the hollow space of the outer case;

a pair of compositions that emit light when mixed with each other; and a spacer arranged in the hollow space of the outer case, wherein one of the compositions is contained in a first space formed inside of the hollow space of the outer case, but outside of the ampoule, and the other of the compositions is contained in the ampoule, the first space in which the one of the compositions is contained is formed circumferentially between the spacer and an inner surface of the outer case, at least one recess is formed at a periphery of the spacer and extends from the periphery of the spacer toward a center of the spacer, and the ampoule is supported in the recess.

2. The chemical illuminant as set forth in claim 1, wherein the outer case and the spacer are both cylindrical, and the spacer is located coaxial with the outer case.

3. The chemical illuminant as set forth in claim 1, wherein the spacer is composed of foaming resin.

4. The chemical illuminant as set forth in claim 3, wherein the spacer is composed of one of polyethylene, polypropylene, and a mixture thereof.

5. The chemical illuminant as set forth in claim 1, wherein a gap between the spacer and the inner surface of the outer case is in the range of about 0.3 mm and about 5.0 mm both inclusive.

6. The chemical illuminant as set forth in claim 1, wherein the spacer has a specific gravity smaller than that of the pair of compositions.

7. The chemical illuminant as set forth in claim 1, wherein the spacer is made of a material which does not absorb the pair of compositions thereinto.

8. The chemical illuminant as set forth in claim 1, wherein the spacer is made of a material by which light is scattered.

9. The chemical illuminant as set forth in claim 1, wherein the recess has such a depth that the ampoule supported therein can make contact with both the recess and the inner surface of the outer case.

10. The chemical illuminant as set forth in claim 1, wherein the spacer has the recesses, the number of the recesses being 2 to 5 both inclusive.

11. A method of fabricating a chemical illuminant defined in claim 1, comprising:

sealing one of opposite ends of the outer case;

inserting one of liquids, the spacer, and the ampoule into the outer case through an open end thereof; and sealing the open end of the outer case.

12. The chemical illuminant as set forth in claim 1, wherein the outer case and the spacer are both columnar, and the spacer is located coaxial with the outer case.

13. The chemical illuminant as set forth in claim 1, wherein the ampoule supported in the recess is sandwiched between the spacer and the inner surface of the outer case.

* * * * *